United States Patent [19]

Megyeri et al.

[11] Patent Number: 4,844,155

[45] Date of Patent: Jul. 4, 1989

[54] PROCESS FOR INCREASING THE YIELD OF OIL RESERVOIRS

[75] Inventors: Mihàly Megyeri; Istvàn Koncz; György Tiszai; Tibor Paál, all of Nagykanizsa; Antal Szittàr, Gellénhàza, all of Hungary

[73] Assignees: Magyar Szénhidrogénipari KutatóFejlesztö, Nagykanizsa; Köolaj és Földgázbanyászati Vállalat, Szászhalombatta, both of Hungary

[21] Appl. No.: 187,238

[22] Filed: Apr. 28, 1988

Related U.S. Application Data

[63] Continuation-in-part of Ser. No. 899,382, Jul. 7, 1986, abandoned.

[51] Int. Cl.$^4$ .................... E21B 43/22; E21B 43/243; E21B 33/138
[52] U.S. Cl. .................... 166/261; 166/268; 166/273; 166/274; 166/288; 166/292
[58] Field of Search .................... 166/261, 272–274, 166/288, 292, 303, 268

[56] References Cited

U.S. PATENT DOCUMENTS

| | | | |
|---|---|---|---|
| 2,903,065 | 9/1959 | Holbrook et al. | 166/272 |
| 3,055,423 | 9/1962 | Parker | 166/288 X |
| 3,070,167 | 12/1962 | Loy, III et al. | 166/153 |
| 3,072,185 | 1/1963 | Bond et al. | 166/261 |
| 3,104,714 | 9/1963 | Terrel et al. | 166/155 |
| 3,180,414 | 4/1965 | Parker | 166/303 X |
| 3,292,702 | 12/1966 | Boberg | 166/303 |
| 3,331,438 | 7/1967 | Slusser | 166/261 |
| 3,530,935 | 9/1970 | Garrett | 166/153 |
| 3,543,852 | 12/1970 | Taylor | 166/155 |
| 3,566,967 | 3/1971 | Shelton et al. | 166/292 X |
| 4,099,566 | 7/1978 | Redford | 166/272 X |
| 4,293,283 | 10/1981 | Roeder | 417/172 |
| 4,418,751 | 12/1983 | Emery | 166/261 |
| 4,495,994 | 1/1985 | Brown et al. | 166/261 |
| 4,597,442 | 7/1986 | Dilgren et al. | 166/303 X |
| 4,605,069 | 8/1986 | McClayglin et al. | 166/310 |

FOREIGN PATENT DOCUMENTS

2107397 4/1983 United Kingdom .

*Primary Examiner*—George A. Suchfield
*Attorney, Agent, or Firm*—Schweitzer & Cornman

[57] ABSTRACT

An improvement is presented in a process for increasing the yield of production wells in crude oil reservoirs having inhomogenous strata, wherein an aqueous solution of a salt is injected through an injection well into the reservoir, without causing fracturing thereof, and then salt crystals are formed at stratum temperature by removing water from the solution. If desired, the salt crystals can be redissolved and reformed at other parts of the reservoir.

7 Claims, No Drawings

PROCESS FOR INCREASING THE YIELD OF OIL RESERVOIRS

This is a continuation-in-part of application Ser. No. 899,382, filed July 7, 1986, now abandoned.

FIELD OF THE INVENTION

The invention relates to a process for increasing the yield of vertically inhomogenous crude oil reservoirs having heterogeneous structure and exploited by gas injection without recourse to fracturing of the strata.

BACKGROUND OF THE INVENTION

It is known from experience with primary and secondary oil recovery methods that the efficacy of the known oil displacement processes is limited, because the fluid injected to displace and drive out the oil does not flood the entire volume of the oil reservoir.

It was concluded that, while on a microscopic scale a displacement coefficient of close to 1, can be achieved, the oil yield is still not satisfactory because the coefficient of volume flooding i.e. the size of the flooded reservoir volume is too small.

This is so because:

(a) the fluid used for displacement and for driving the oil out cannot flood but a part of a the oil bearing rock formations due to its micro- and macroscopic heterogeneity; and (b) parts of the reservoir with considerable oil content remain untouched due to the difference in mobility between the oil being displaced and of the displacing fluid.

This undesirable occurrence in the reservoir is also known as "fingering" or "disjoining".

The term "vertically inhomogenous" as used throughout the specification and the claims, means that the permeability of the strata in the vertical direction is by at least an order of magnitude lower than the permeability in the horizontal direction. This occurs, for example, when parts of the reservoir are separated from each other by at least one or more marl stratum.

The term "secondary recovery" as used throughout the specification and the claims is intended to refer to any level of recovery that is subsidiary to primary recovery.

Another problem that occurs in secondary recovery processes takes place when working with a drive-out gas which will mix, partially or not at all with the oil and gas. In such cases insufficient flooding of the reservoir volume may occur. The large difference between the viscosities of the gas and the oil results in a pronounced "finger formation" and, on the other hand, the gas injected into heterogeneous reservoirs passes quickly through parts having good permeability and reaches the production well too fast without providing a suitable yield of oil.

Various other processes were suggested in the prior art to avoid the aforementioned results. A general feature of such other processes is that the displacing fluid is forced towards low-permeability parts of the reservoir by decreasing the permeability of those parts which the fluid penetrates easily.

Injecting gas and water alternatively or simultaneously is a method that is generally applied for increasing the efficiency of volume flooding [Caudle, B. H., Dyes, A. B., AIME 1958, 213–81]. Gas permeability of the stratum decreases in the three-phase flooding zone that is formed in this manner, resulting in some reservoirs in an increased efficiency of volume flooding.

According to U.S. Pat. No. 3,096,821 an increased efficiency of volume flooding is achieved by simultaneously injecting water and gas that mixes with oil into the reservoir.

U.S. Pat. No. 3,599,715 relates to a process wherein the mobility of the displacing gas is decreased by adding foaming agents to the gas.

U.S. Pat. No. 3,342,256 describes a process wherein the efficiency of oil production is increased by using carbon dioxide for forming a foam in situ in the reservoir.

A combined process for crude oil production is described in Hungarian Patent No. 177,703, wherein efficiency of gas flooding was improved by alternately injecting foaming agents and a disperse system into the reservoir.

U.S. Pat. No. 3,866,680 describes a process wherein the undesired effect of heterogeneity can be eliminated by injecting an emulsion.

The fast "break-through" of a miscible fluid, according to U.S. Pat. No. 4,129,182 can be avoided by first applying a solution such as a polymer solution, to decrease the permeability.

Hungarian Patent No. 173,636 describes a process, wherein the efficiency of an underground burning process is increased by injecting in metal additives and water.

It is known from U.S. Pat. No. 2,903,065 and USSR Patent No. 1,030,534 that efficiency of water flooding can be increased by injecting a salt solution having a higher temperature than the reservoir, and salt-crystals precipitate due to cooling.

None of the known gas driving displacement techniques were found to offer a satisfactory solution. A further disadvantage of these prior art processes is that their application requires expensive foaming agents such as detergents, polymers, dispersing agents and, therefore, these processes are very costly and often uneconomical.

Use of the known processes is also hindered by the fact that oil-bearing rock and the fluid in the stratum may change the composition of the injected displacing compounds, resulting in a flooding process that can get out of control.

The aim of the present invention is to provide a process for increasing the efficiency of volume flooding of oil reservoirs exploited by a gas injection procedure.

DETAILED DESCRIPTION OF THE INVENTION

In accordance with the present invention a satisfactorily complete volume penetration can be achieved in a secondary oil recovery process from a vertically inhomogenous oil reservoir and employing an injection well and one or more producing wells by injecting an aqueous salt solution through the injection well into the reservoir and then at reservoir temperature producing salt crystals in the pores of the oil-bearing rock formation by total or partial extraction of the solvent. Injection of the solution is carried out at a pressure which exceeds the pressure of the reservoir to assure the penetration of the solution into the strata. The injection pressure, however, is not so large as to induce fracturing of the strata. In fact, fracturing of the strata is undesirable from the point of view of the present invention. The oil content of the reservoir is then ready for recovery by secondary exploitation methods, such as gas driving.

In the aqueous solution one or more inorganic salts such as sodium chloride, potassium chloride, sodium sulfate, or a double salt such as potassium aluminum sulfate can be employed. The salt can also be formed by a chemical reaction in situ in the reservoir. The application of sodium chloride salt in an aqueous solution is considered particularly preferable.

Salt crystals are produced at reservoir temperature in the pores of the vertically inhomogenous oil-bearing rock through the formation of horizontally generally substantially separate annular zones that radiate outwardly from the injection well, by totally or partially extracting the solvent for the salt by the application of methods that are known per se for example, evaporation, dissolution, etc.

Salt crystals are formed in accordance with the present invention in a generally substantially horizontal flow direction in the more permeable parts of the heterogeneous oil bearing reservoir. The resulting decrease in permeability decreases the heterogeneity of the reservoir and, conversely, the process of the present invention results in a greater homogeneity of the reservoir strata. This can result, depending on the extent of the vertical inhomogeneity in various degrees of salt plugging between vertically adjacent inhomogenous strata.

Salt crystals that were precipitated, can be optionally partially or completely brought back into solution by injecting additional solvent for the salt into the reservoir through the injection well. As a further optional alternative, such salt crystals can be reprecipitated in another part of the reservoir. Permeability of different parts of the oil-bearing rocks can be controlled in this manner in accordance with the prevailing conditions.

According to the process of the invention an increased yield of oil reservoirs can be obtained with secondary recovery by gas injection by introducing an aqueous salt solution into the vertically inhomogenous reservoir through an injection well, and forming salt crystals in the pores of the oil-bearing rock at reservoir temperature, by totally or partially extracting the solvent, such as by the use of an aliphatic alcohol or ethanol or methanol or gas flow which carry away the solvent. The crystals can be partially or totally brought back into the solution, if desired, by injecting additional solvent into the strata of the oil reservoir, optionally salt crystals can be formed in another part of the reservoir.

The process of the present invention can be easily carried out, it is inexpensive, it does not require any heating, and can employ low cost materials that are readily available everywhere.

In the displacement of the oil the salt solution introduced into the oil-bearing rock has a beneficial effect on the separation of gases between the water and the oil phase, especially on the separation of the gases that are well soluble in water, such as carbon dioxide.

The following examples illustrate our process without limiting the scope of the claims.

EXAMPLE 1

Parameters of a vertically inhomogenous porous sandstone are: porosity 0.21 m$^3$ pore volume/m$^3$ rock volume (between extreme porosity values of 0.17 and 0.23); permeability 0.060 $\mu m^2$ (between the extreme values of 0.01–0.1 $\mu m^2$); bed-temperature 64° C.; starting bed-pressure 100 bar; dissolved gas/oil ratio 56 m$^3$/m$^3$; volume-change coefficient 1.225; density of the oil in the reservoir at 20° C. 819 kg/m$^3$; and starting relative water content 0.3 m$^3$ water/m$^3$ pore volume.

The reservoir was exploited during primary recovery to a pressure of 36 bar. The production ($E_{R1}$) was 0.38 obtained by dissolved gas and water flooding. After primary depletion the reservoir was further exploited by secondary recovery using natural gas containing 80% carbon dioxide.

Two neighboring units on an oil field having identical parameters and being exploited by 5-point flooding (4 production wells and 1 injection well) were considered suitable for comparing the traditional carbon dioxide recovery method with the method of the present invention.

Both of the neighboring 5-point comparison units had 17,500 m$^3$ pore volume and contained a 10,000 m$^3$ oil at the start. In the course of primary exploitation 3,800 m$^3$ oil was produced with the amount of oil recovery by primary flooding related to the original geological resources of the reservoir being $E_{R1}=0.38$.

Exploitation of unit No. 1 by the traditional carbon dioxide method employed bed pressure of the oil-bearing formation increased to 100 bar by introducing through the injection well a natural gas containing carbon dioxide, while a controlled oil production was carried out at the production wells. A natural gas was injected in at the injection well, containing carbon dioxide in an amount of 0.36 pore volume (at 100 bar and 64° C.), the added oil production was 0.03, and the reservoir was then subjected to a cyclic introduction of water and gas at 100 bar. The gas was a natural gas containing 80% carbon dioxide and the water was fresh water.

As a result of injecting a gas in an amount of 0.2 pore volume, oil yield increased further by a value of 0.12. At the end of the secondary exploitation 0.3 pore volume water was again injected in and an increase of 0.03 in oil yield was observed. Oil yield was increased by secondary flooding ($E_{R2}$) by 0.18; thus the total oil yield ($E_{R2}$) obtained was 0.56. The process of the present invention can then be employed as a method for a tertiary exploitation in unit No. 1 of the two comparison units, that was exploited earlier by a traditional method that employed secondary production by using carbon dioxide.

In the first step of the process of the present invention 0.3 of the pore volume of natural gas containing carbon dioxide and 0.3 of the pore volume of a concentrated salt solution are alternatively injected into the reservoir through the injection well of the unit in doses of max. 0.05 pore volume each, and finally a dose of 0.15 of pore volume of carbon dioxide is introduced.

As a result of above measures oil yield increased by 0.12. On subsequent injection of 0.3 of the pore volume of fresh water, the oil yield increased further by 0.08. In the tertiary oil production applying the process of the invention $E_{R3}=0.2$ excess oil was recovered. Thus the final oil yield amounted to $E_{R3}=0.75$.

EXAMPLE 2

According to the process of the present invention secondary exploitation is carried out in comparison unit No. 2.

The first step of the process involves raising bed-pressure to 100 bar by natural gas containing 80% carbon dioxide, while controlled oil-production is carried out. This was identical with the applied in unit No. 1 in Example 1.

Upon injecting in 0.36 of the pore volume of gas, the amount of excess oil produced was 0.03. Then 0.3 of pore volume of concentrated salt solution and 0.3 of the pore volume of carbon dioxide containing natural gas were injected into the reservoir in doses of about 0.05 of the pore volume each, or in even smaller doses and, finally 0.15 of the pore volume of gas was introduced into the bed. The increase in oil yield was 0.24.

In the last step of the process 0.3 of the pore volume of fresh water was injected in and an excess oil yield of 0.12 was obtained.

As a result of the secondary exploitation the excess oil amounted to $E_{R12}=0.39$ and the total oil yield increased to $E_{R2}=0.77$. The latter result exceeds the oil yield obtained by the traditional method of secondary production by 0.21.

EXAMPLE 3

A depleted, vertically inhomogenous oil reservoir containing heavy oil is further exploited by air injection process. The average parameters of the reservoir are: porosity 0.28; permeability 1 $\mu m^2$; bed pressure 20 bar; bed temperature 40° C.; oil density at 20° C. 895 kg/m$^3$; and oil viscosity 50 m Pa.s.

The primary method of exploitation was depletion and water flooding. The primary oil yield was $E_{R1}=0.22$; the residual oil was 0.52.

The relative air consumption in the wet combustion process employed for secondary production was 230 m$^3$/m$^3$ pore volume, while the water/air ratio was 0.002 m$^3$/m$^3$. As a final oil yield $E_{R2}=0.52$ was achieved. The excess oil yield was $E_{R12}=0.30$.

When a concentrated salt solution was used in accordance with the present invention instead of fresh water, and the same water to air ratio of 0.002 m$^3$/m$^3$ was employed, the relative air requirement was 190 m$^3$/m$^3$ pore volume. The final oil yield ($E_{R12}$) was 0.66 and the excess oil yield ($E_{R12}$) was 0.44.

The Examples clearly demonstrate that a considerable amount of excess oil can be produced by the use of the process of the present invention.

We claim:

1. In a process for increasing the yield of crude oil recovery through one or more production wells in a vertically and inhomogenous reservoir by the injection of a gas through an injection well, the improvement of which comprising introducing an aqueous salt solution through the injection well into the strata of the reservoir at a pressure larger than the pressure of said reservoir, but insufficient to cause fracturing thereof, and producing salt crystals in the pores of the strata at a stratum temperature, by partially or totally extracting the water content of said solution by injection an aliphatic alcohol through said injection well.

2. The improvement of the process of claim 1, further comprising partially or totally redissolving the salt crystals by introducing additional water, or aqueous salt solution into the oil bearing strata.

3. The improvement in the process of claim 2, further comprising re-forming at stratum temperature salt crystals in another part of the reservoir by partially or totally extracting the water content of the solution of said redissolves salt crystals.

4. The improvement in the process of claim 1, wherein said eliminating of the water content comprises evaporating the water solvent into the injected gas.

5. The improvement in the process of claim 1, wherein said aliphatic alcohol is methanol, or ethanol.

6. The improvement in the process of claim 1, wherein said salt is on or more of sodium chloride, potassium chloride, sodium sulfate, and potassium aluminum sulfate.

7. The improvement in the process of claim 1, wherein said salt crystals are formed in situ in the pores of the strata of the reservoir.

* * * * *

UNITED STATES PATENT AND TRADEMARK OFFICE
CERTIFICATE OF CORRECTION

PATENT NO. : 4,844,155
DATED : July 4, 1989
INVENTOR(S) : Mihály Megyeri et al.

It is certified that error appears in the above-identified patent and that said Letters Patent is hereby corrected as shown below:

In claim 1, line 3, delete "and",

Signed and Sealed this

Fifth Day of June, 1990

Attest:

HARRY F. MANBECK, JR.

*Attesting Officer*   *Commissioner of Patents and Trademarks*